US012811332B2

(12) United States Patent
Kozono et al.

(10) Patent No.: US 12,811,332 B2
(45) Date of Patent: Nov. 24, 2026

(54) CONNECTOR WITH ROTATING COVER AND ANNULAR PACKING

(71) Applicant: Yazaki Corporation, Tokyo (JP)

(72) Inventors: Seiji Kozono, Shizuoka (JP); Yoshitaka Tsushima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 309 days.

(21) Appl. No.: 18/755,034

(22) Filed: Jun. 26, 2024

(65) Prior Publication Data

US 2024/0347959 A1 Oct. 17, 2024

Related U.S. Application Data

(63) Continuation of application No. PCT/JP2023/003678, filed on Feb. 3, 2023.

(30) Foreign Application Priority Data

Feb. 21, 2022 (JP) ................................ 2022-025079

(51) Int. Cl.
*H01R 13/447* (2006.01)
*H01R 13/52* (2006.01)

(52) U.S. Cl.
CPC ....... *H01R 13/447* (2013.01); *H01R 13/5213* (2013.01)

(58) Field of Classification Search
None
See application file for complete search history.

(56) References Cited

U.S. PATENT DOCUMENTS 5,573,412 A * 11/1996 Anthony ............ H01R 13/6397 220/242
6,102,688 A 8/2000 Mifune et al.
11,152,774 B2 10/2021 Yoshihara
(Continued)

FOREIGN PATENT DOCUMENTS

JP H10-232021 A 9/1998
JP 2013-196887 A 9/2013
(Continued)

OTHER PUBLICATIONS

Mar. 20, 2023—International Search Report—Intl App PCT/JP2023/003678.

*Primary Examiner* — Tho D Ta
(74) *Attorney, Agent, or Firm* — Banner & Witcoff, Ltd.

(57) ABSTRACT

A connector includes: a housing having an opening portion having a tubular shape; a rotating cover having a tubular portion fitted into the opening portion and rotatably attached to the housing; and an annular packing disposed at a fitting portion of the opening portion and the tubular portion and configured to seal the fitting portion by being compressed in a direction intersecting a connector fitting direction. The annular packing includes a first sealing portion and a second sealing portion, the first sealing portion is provided at a position closer to a rotating shaft of the rotating cover than the second sealing portion, and the second sealing portion is provided at a position farther away from the rotating shaft than the first sealing portion, and is compressed between the opening portion and the tubular portion at the same timing as the first sealing portion when the rotating cover is closed.

1 Claim, 13 Drawing Sheets

(56) References Cited

U.S. PATENT DOCUMENTS

| | | | | |
|---|---|---|---|---|
| 11,329,421 | B2 * | 5/2022 | Chen ........................ | B60R 16/02 |
| 11,590,852 | B2 * | 2/2023 | Hitchcock .......... | H01R 13/5213 |
| 2015/0137756 | A1 | 5/2015 | Fukushima et al. | |
| 2020/0091695 | A1 | 3/2020 | Yoshihara | |
| 2022/0340025 | A1 * | 10/2022 | Hitchcock .......... | H01R 13/5213 |

FOREIGN PATENT DOCUMENTS

| | | | |
|---|---|---|---|
| JP | 2014-032901 | A | 2/2014 |
| JP | 2020-048263 | A | 3/2020 |
| JP | 2021-035853 | A | 3/2021 |

* cited by examiner

CONNECTOR WITH ROTATING COVER AND ANNULAR PACKING

CROSS-REFERENCE TO RELATED APPLICATIONS

This is a continuation of International Application No. PCT/JP2023/003678 filed on Feb. 3, 2023, and claims priority from Japanese Patent Application No. 2022-025079 filed on Feb. 21, 2022, the entire content of which is incorporated herein by reference.

TECHNICAL FIELD

The present invention relates to a connector with a rotating cover.

BACKGROUND ART

In the related art, wire harnesses (electric wires) that electrically connect various electric components mounted on an automobile or the like are connected by connectors. The connector generally includes a male connector and a female connector. In a charging inlet device mounted on, for example, an electric vehicle or the like and performing battery charging, there is a charging inlet device including a cap (rotating cover) in a front opening (tubular opening portion) of a housing for the purpose of dustpoof, terminal protection, and prevention of electric shock to the surroundings (see Patent Literature 1). The cap is rotatably provided between a closed position where the cap is in close contact with a front wall of the housing to close the front opening and an open position where the cap is separated from the front wall and opens the front opening.

Further, an electric junction box in which an accommodating box and an adhesion member that is in close contact with a connector inserted into an insertion port of the accommodating box are disposed between the connector and the accommodating box, and the insertion port is sealed by the connector and the adhesion member is known (see Patent Literature 2). The adhesion member (annular packing) made of rubber has an annular shape, is disposed in a recess provided in a column portion of the connector, and surrounds the column portion. The adhesion member is in close contact with a covering portion of the accommodating box and the column portion of the connector, thereby sealing the insertion port and preventing water from entering the accommodating box through the insertion port.

CITATION LIST

Patent Literature

Patent Literature 1: JP2014-032901A
Patent Literature 2: JP2020-048263A

SUMMARY OF INVENTION

Technical Problem

At this point, since the cap disclosed in Patent Literature 1 is rotatably attached to the housing, when the cap is closed, there is a difference in a timing at which the packing disposed on the inner face of the cap and the front wall of the housing come into contact with each other. There is a concern that compressive deformation of the packing is not uniform and a waterproof property is deteriorated.

Further, in a adhesion member disclosed in Patent Literature 2, in a case where a connector is rotatably attached to an accommodating box, when a column portion of the connector is closed, a difference occurs in a timing at which the adhesion member disposed in a peripheral direction of the column portion is in contact with a covering portion of the accommodating box, there is a concern that this may lead to contact failure such as deviation or biting of the adhesion member, resulting in a decrease in a waterproof property.

The present invention has been made in view of the above-described circumstances, and an object thereof is to provide a connector capable of ensuring stable waterproof performance in a connector with a rotating cover.

Solution to Problem

The object of the present invention is achieved by the following configuration.

A connector includes:

a housing having a tubular opening portion;

a rotating cover having a tubular portion fitted into the opening portion and rotatably attached to the housing; and an annular packing disposed at a fitting portion of the opening portion and the tubular portion and configured to seal the fitting portion by being compressed in a direction intersecting a connector fitting direction, wherein the annular packing includes a first sealing portion and a second sealing portion, the first sealing portion is provided at a position closer to a rotating shaft of the rotating cover than the second sealing portion, and the second sealing portion is provided at a position farther away from the rotating shaft than the first sealing portion, and is compressed between the opening portion and the tubular portion at the same timing as the first sealing portion when the rotating cover is closed.

Advantageous Effects of Invention

According to the present invention, it is possible to provide a connector capable of ensuring stable waterproof performance in a connector with a rotating cover.

The present invention has been briefly described above. Further, details of the present invention can be clarified by reading modes (hereinafter, referred to as "embodiments") for carrying out the invention to be described below with reference to the accompanying drawings.

DESCRIPTION OF EMBODIMENTS

Hereinafter, embodiments of the present invention will be described with reference to the drawings.

Figure 1:
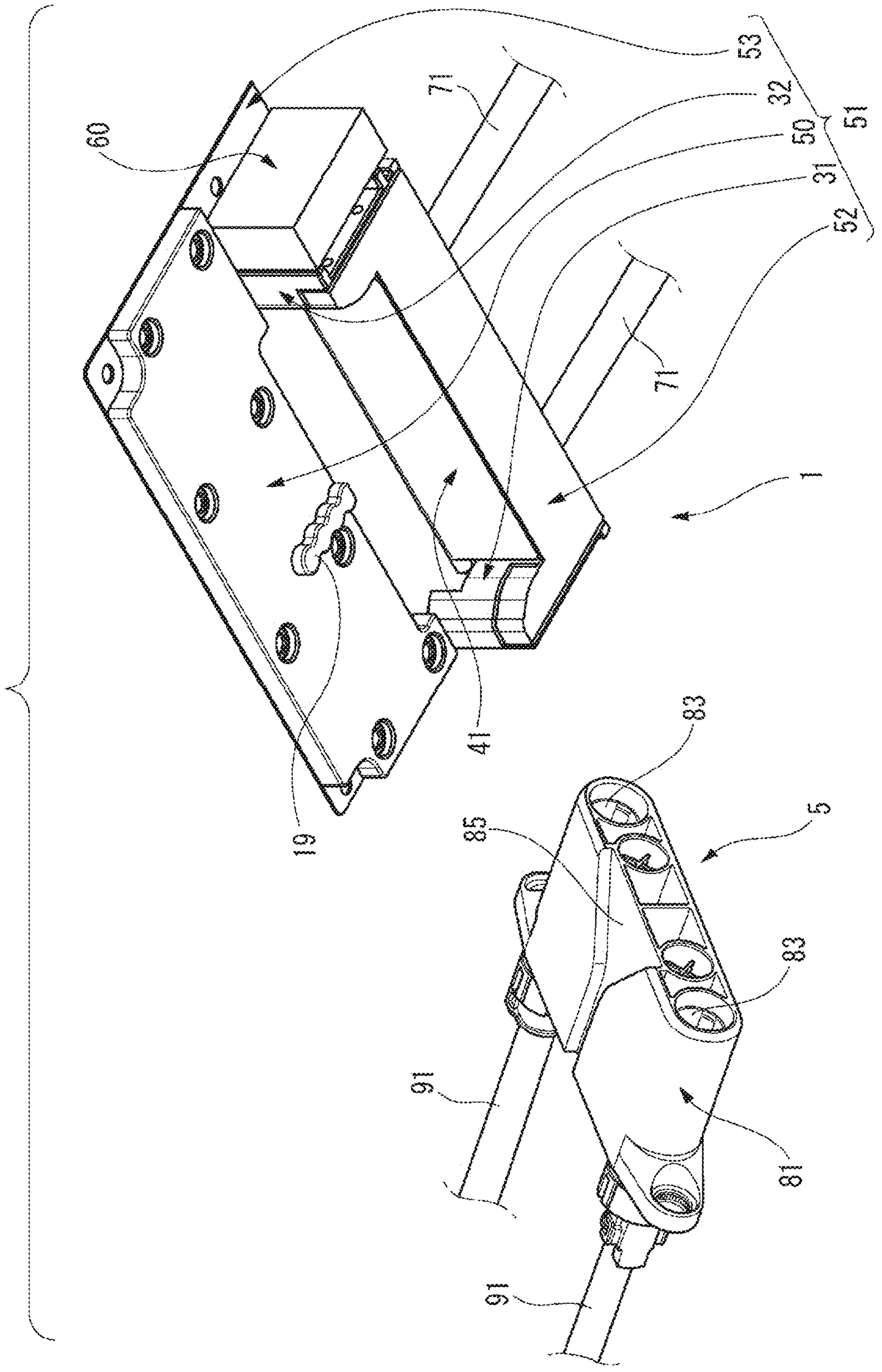
FIG. 1 is a perspective view showing an inlet constituting a connector according to a first embodiment of the present invention and an inlet plug which is a counterpart connector fitted to the inlet.
Figure 2:
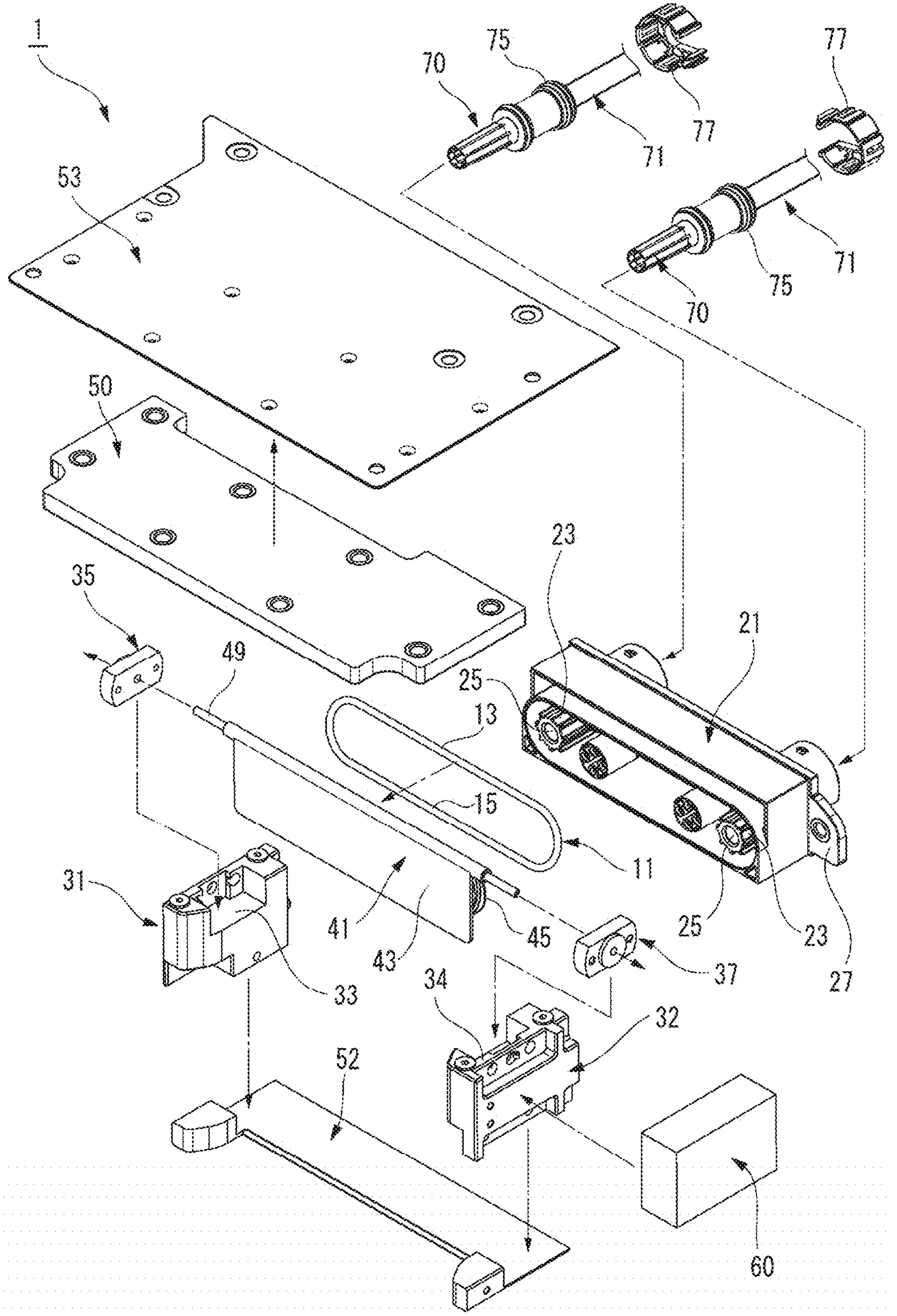
FIG. 2 is an exploded perspective view of the inlet shown in FIG. 1.
Figure 3:
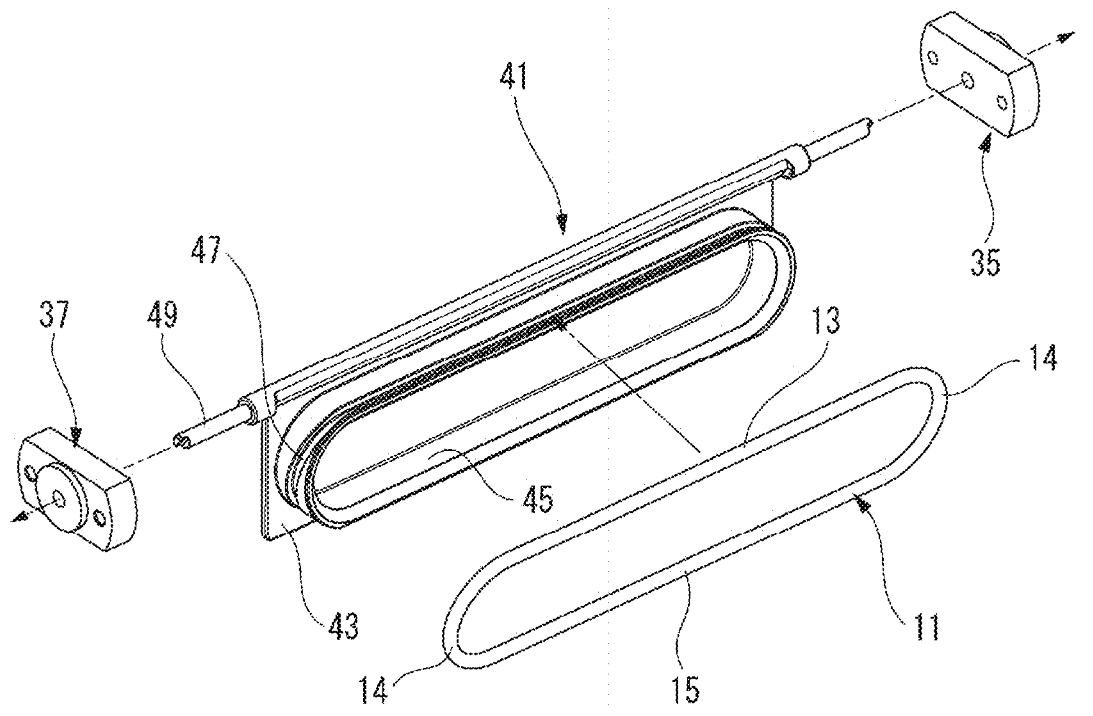
FIG. 3 is an exploded perspective view of a back side of a rotating cover shown in FIG. 2.
Figure 4:
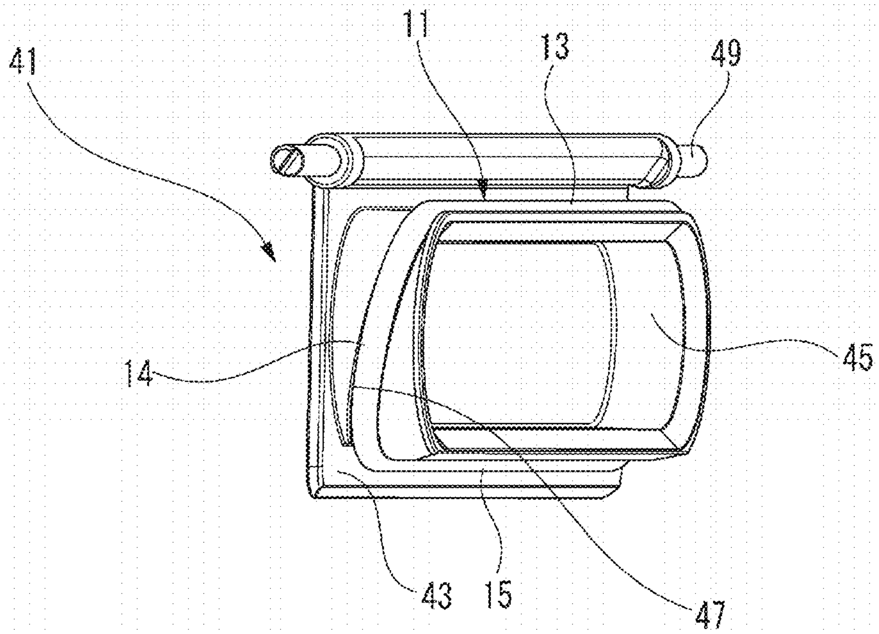
FIG. 4 is a perspective view showing a state in which an annular packing shown in FIG. 3 is mounted on a tubular portion of the rotating cover.
Figure 5:
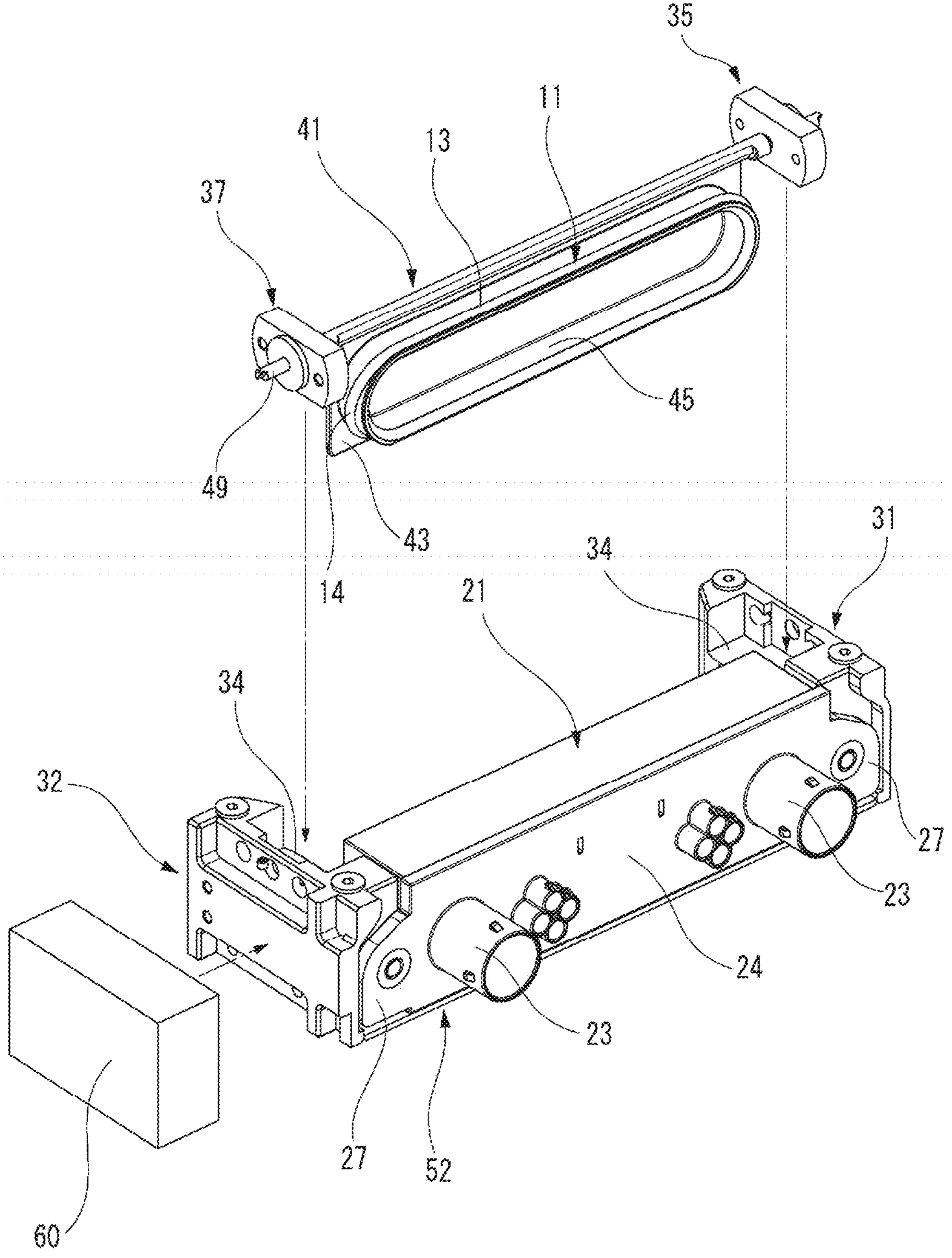
FIG. 5 is a perspective view illustrating a procedure for attaching the rotating cover shown in FIG. 4 to a housing.

FIG. 1 is a perspective view showing an inlet 1 constituting a connector according to a first embodiment of the present invention and an inlet plug 5 which is a counterpart connector fitted to the inlet 1. FIG. 2 is an exploded perspective view of the inlet 1 shown in FIG. 1. FIG. 3 is an exploded perspective view of a back side of a rotating cover 41 shown in FIG. 2. FIG. 4 is a perspective view showing a state in which an annular packing 11 shown in FIG. 3 is mounted on a tubular portion 45 of the rotating cover 41. FIG. 5 is a perspective view illustrating a procedure for attaching the rotating cover 41 illustrated in FIG. 4 to the housing 21.

As shown in FIGS. 1 and 2, the inlet 1, which is a connector according to the first embodiment, includes a housing 21 that accommodates connection terminals 70, an outer case 51 that accommodates and holds the housing 21, the rotating cover 41 that covers a tubular opening portion 26 of the housing 21 into which a plug housing 81 of the inlet plug (counterpart connector) 5 is fitted, and an actuator 60 that causes the rotating cover 41 to open and close.

In the present specification, a front-rear direction is a direction along a connector fitting direction (a left-right direction in FIG. 7) of the housing 21, a side on which the plug housing 81 of the inlet plug 5 is fitted is referred to as a front side, an upper-lower direction is a direction (the upper-lower direction in FIG. 7) that is orthogonal to the connector fitting direction of the housing 21 and in which the rotating cover 41 is opened and closed, and a top plate 53 side of the outer case 51 is referred to as an upper side.

As shown in FIG. 1, the inlet plug 5 which is fitted and electrically connected to the inlet 1 includes mating connection terminals (not shown) connected to terminal portions of high-voltage cables 91 and fitted to the connection terminals 70 of the inlet 1, and a plug housing 81 having a pair of terminal accommodating chambers 83, 83 that accommodate the mating connection terminals which are male terminals.

The plug housing 81 is formed of an electrically insulating synthetic resin. An fitting guide groove 85 is formed on an upper face of the plug housing 81. The fitting guide groove 85 has a tapered portion whose width increases toward the inlet 1. When the inlet plug 5 is fitted into the inlet 1, the fitting guide groove 85 can guide the plug housing 81 to fit into the housing 21 by being engaged with a pick-up rib 19 provided at an eave portion 50 of the inlet 1.

As shown in FIG. 2, the housing 21 of the inlet 1 is formed in a flat rectangular parallelepiped shape from an electrically insulating synthetic resin, and has a pair of terminal accommodating tube portions 23, 23 that are integrally formed on a rear wall 24 and protrude toward an inlet plug 5 side. Further, the terminal accommodating tube portions 23, 23 are arranged in the tubular opening portion 26 having a flat elliptical cross section.

The connection terminal 70 connected to the terminal portion of the high-voltage cable 71 is accommodated in the terminal accommodating tube portion 23. A front opening 25 into which the mating connection terminal of the inlet plug 5 is inserted is formed in a front end of the terminal accommodating tube portion 23. The high-voltage cable 71 connected to the connection terminal 70 is drawn out from a rear end opening of the terminal accommodating tube portion 23.

The connection terminal 70 is a female terminal formed of a conductive metal material, and includes a plurality of flexible pieces arranged in a cylindrical shape. A connecting hole 72 is formed at a rear end portion of the connection terminal 70, and a conductor 73 of the high-voltage cable 71 pulled out from the rear end opening of the terminal accommodating tube portion 23 is inserted into the connecting hole 72 and connected by crimping (see FIG. 7).

A sealing member 75 is attached to the high-voltage cable 71 pulled out from the rear end opening of the terminal accommodating tube portion 23, and is fluid-tightly sealed against the terminal accommodating tube portion 23. Detachment of the sealing member 75 is restricted by the rear holder 77 attached to a rear end of the terminal accommodating tube portion 23 (see FIG. 7).

As shown in FIGS. 1 and 2, the outer case 51 is a flat enclosure formed of a rectangular top plate 53 in which the housing 21 is disposed at a rear portion, a rectangular plate-shaped eave portion 50 disposed at a front portion of the top plate 53, a bottom plate 52 covering a lower side of the housing 21, and support walls 31 and 32 serving as both side walls.

The pick-up rib 19 for guiding the plug housing 81 of the inlet plug 5 to fit into the housing 21 accommodated in the outer case 51 extends along the connector fitting direction on a lower face of a central portion of the eave portion 50.

The fitting flanges 27 provided on both side portions of the housing 21 are respectively screwed and fixed to rear faces of the support walls 31 and 32. The top plate 53 and the bottom plate 52 to which the eave portion 50 is screwed are respectively screwed to top faces and bottom faces of the support walls 31 and 32.

In upper portions of the support walls 31 and 32, holding portions 33 and 34 for accommodating and holding bearing members 35 and 37 for rotatably supporting a rotating shaft 49 of the rotating cover 41 are provided. An actuator 60 for rotationally driving the rotating shaft 49 of the rotating cover 41 is attached to an outer side face of the support wall 32.

In the inlet 1 of the first embodiment, a cover front wall 43 of the rotating cover 41 is rotated toward the top plate 53 side of the outer case 51 to be in a cover open position. The rotating shaft 49 of the rotating cover 41 is disposed on an upper side of the cover front wall 43. On the other hand, when the cover front wall 43 is rotated toward a bottom plate 52 side of the outer case 51 to be in a cover open position, the rotating shaft 49 of the rotating cover 41 is disposed on a lower side of the cover front wall 43.

As shown in FIGS. 3 and 4, the rotating cover 41 includes the flat rectangular plate-shaped cover front wall 43, a rotating shaft 49 disposed on the upper side of the cover front wall 43, the tubular portion 45 protruding from an inner face of the cover front wall 43 and fitted into the opening portion 26 of the housing 21, and an annular packing 11 disposed at a fitting portion of the tubular portion 45.

The tubular portion 45 of the rotating cover 41 has a flat elliptical cross-section and is fitted into the opening portion 26 of the housing 21. An annular accommodating groove 47 to which the annular packing 11 is attached is provided in an outer peripheral face of the tubular portion 45.

As shown in FIG. 3, the flat long elliptical annular packing 11 includes a linear first sealing portion 13 and a linear second sealing portion 15 that are arranged parallel to the rotating shaft 49, and semicircular third sealing portions 14 and 14 that respectively connect both end portions of the first sealing portion 13 and the second sealing portion 15.

A portion of the accommodating groove 47 in which the first sealing portion 13 is accommodated is formed parallel to the rotating shaft 49 on a protruding end side of an upper face of the tubular portion 45. Further, a portion of the accommodating groove 47 in which the second sealing portion 15 is accommodated is formed parallel to the rotating shaft 49 on a base end side of a lower face of the tubular portion 45. Portions of the accommodating groove 47 in which the third sealing portions 14 and 14 are respectively accommodated are formed on both side faces to be inclined with respect to an axial direction (connector fitting direction) of the tubular portion 45.

Accordingly, as shown in FIG. 4, the first sealing portion 13 is provided at a position closer to the rotating shaft 49 of the rotating cover 41 than the second sealing portion 15. The second sealing portion 15 is disposed at a position farther away from the rotating shaft 49 than the first sealing portion 13, and is disposed to be compressed between the opening portion 26 and the tubular portion 45 at the same timing as the first sealing portion 13 when the rotating cover 41 is closed (see FIG. 8).

That is, the annular packing 11 accommodated in the accommodating groove 47 is provided such that, when the rotating cover 41 is closed, the first sealing portion 13, the second sealing portion 15, and the third sealing portions 14 and 14 are located on a plane S1 (see FIG. 9) that is inclined with respect to and intersects the connector fitting direction of the tubular portion 45 and is parallel to the rotating shaft 49. Further, the annular packing 11 is provided such that, when the rotating cover 41 is closed, the second sealing portion 15 is located on a plane S2 (see FIG. 9) including the rotating shaft 49 in a direction orthogonal to the connector fitting direction.

As shown in FIG. 5, bearing members 35 and 37 are mounted on both ends of the rotating shaft 49 of the rotating cover 41 in which the annular packing 11 is attached to the tubular portion 45. Next, the bearing members 35 and 37 are respectively fixed to the holding portions 33 and 34 of the support walls 31 and 32 fixed to the bottom plate 52 and the housing 21, and thus the rotating cover 41 is disposed in front of the housing 21.

In the rotating cover 41 attached so as to be capable of opening and closing the opening portion 26 of the housing 21, an end portion of the rotating shaft 49 inserted into the bearing member 37 is connected to a drive shaft of the actuator 60. Then, the top plate 53 is screw-fixed above the housing 21 to which the rotating cover 41 is attached and the support walls 31 and 32, and assembly of the inlet 1 is completed.

The assembled inlet 1 is attached to, for example, a vehicle body of an electric automobile via the top plate 53. Here, an upper-lower direction of the vehicle body is the upper-lower direction of the inlet 1 when the vehicle body is attached.

When the inlet plug 5 is not fitted to the inlet 1, the cover front wall 43 of the rotating cover 41 is set to a cover closed position (see FIG. 1) covering the tubular opening portion 26 of the housing 21. When the inlet plug 5 is fitted to the inlet 1, the cover front wall 43 of the rotating cover 41 is set to a cover open position at which the tubular opening portion 26 of the housing 21 is opened.

Next, an operation of the above-described rotating cover 41 will be described.

Figure 6:
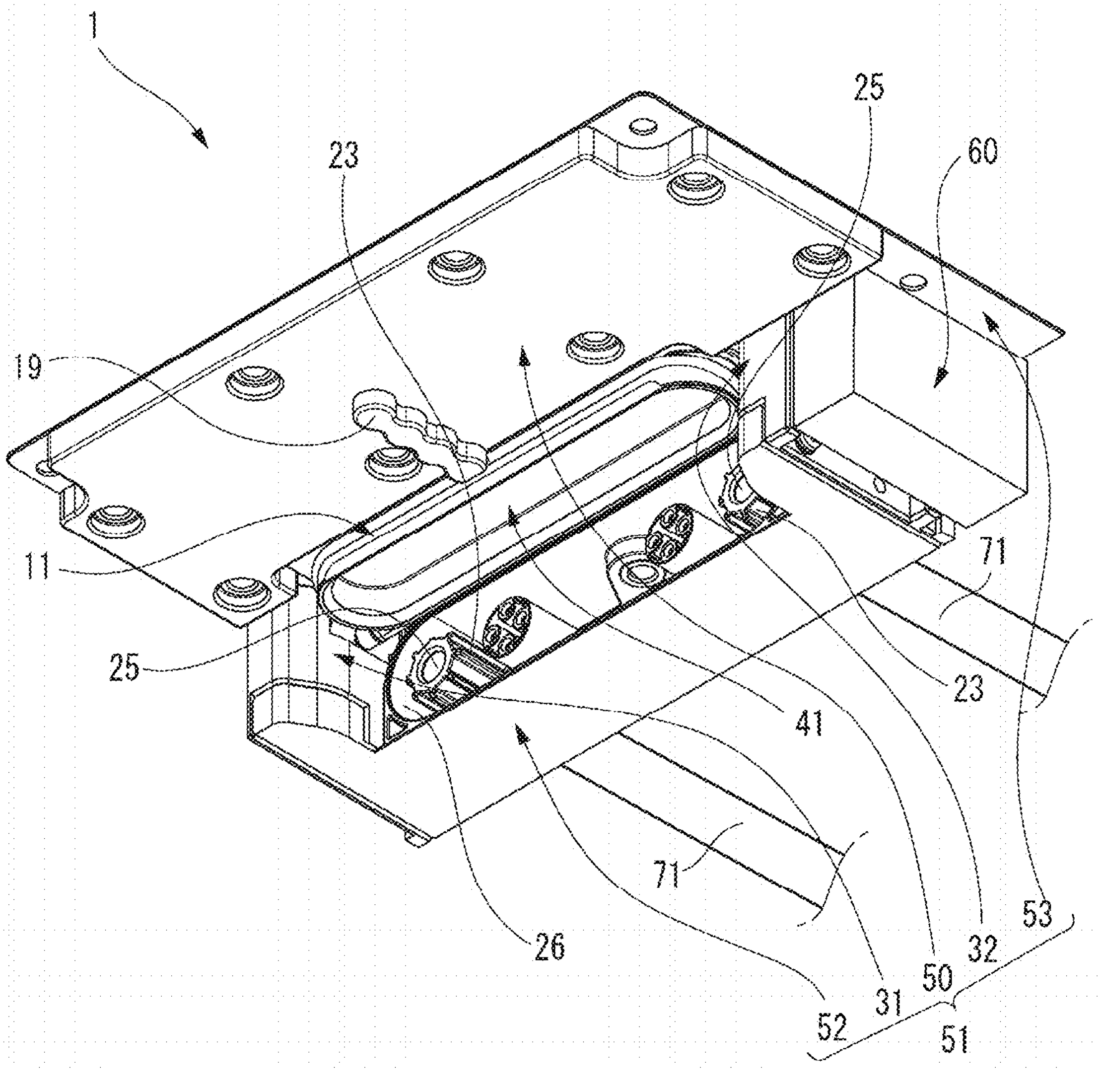
FIG. 6 is a perspective view of the inlet showing a state in which the rotating cover is opened.
Figure 7:
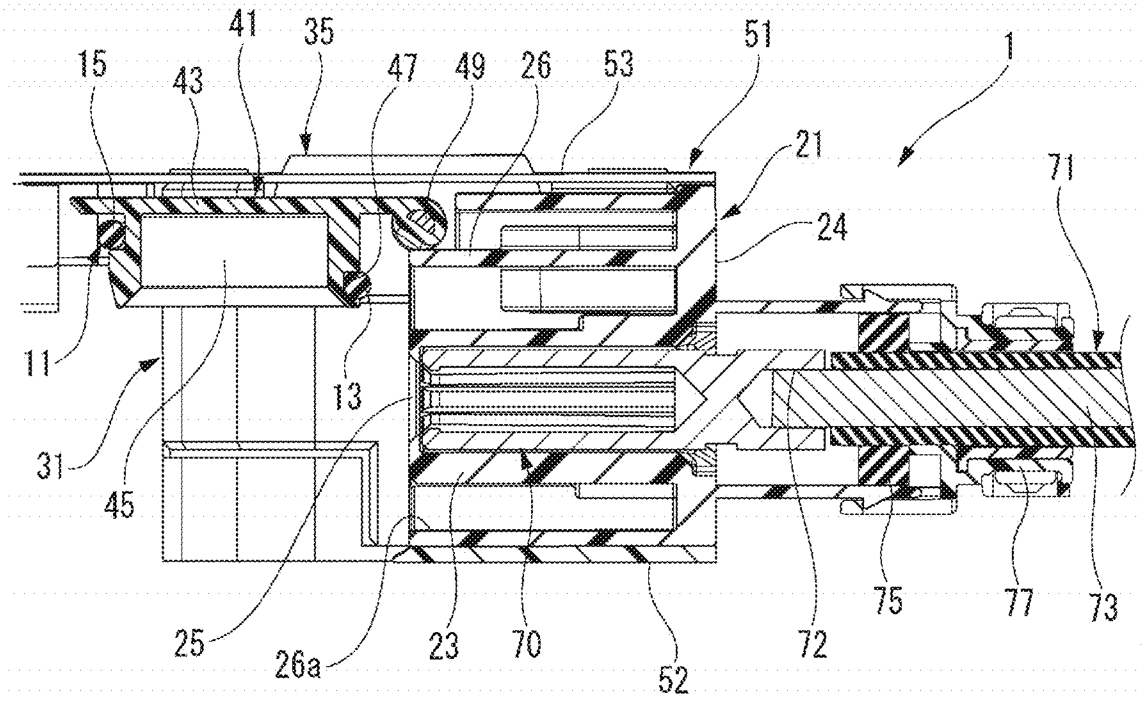
FIG. 7 is a longitudinal sectional view taken along an axis of a connection terminal of the inlet shown in FIG. 6.
Figure 8:
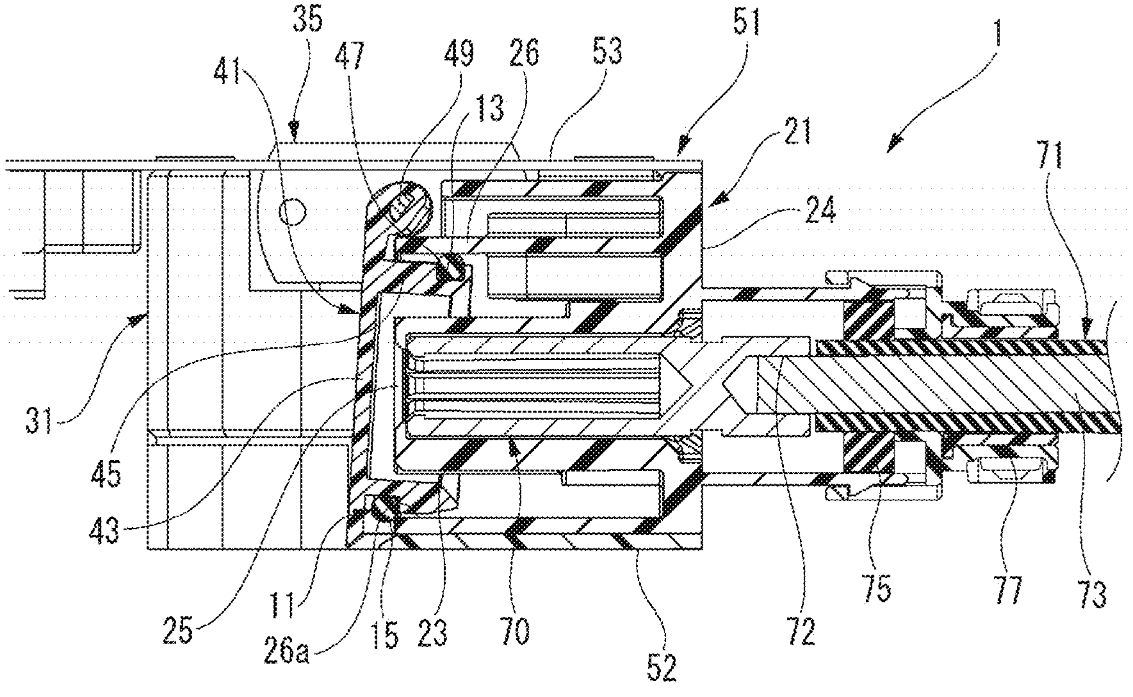
FIG. 8 is a longitudinal sectional view showing a state immediately before the rotating cover shown in FIG. 7 is closed.
Figure 9:
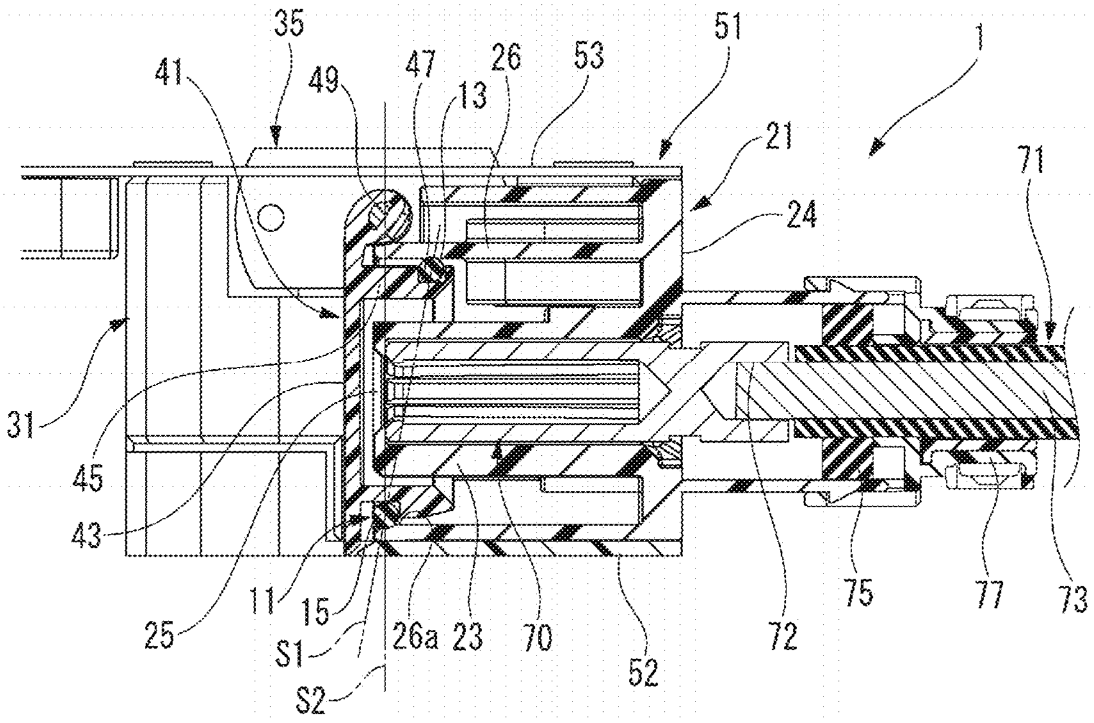
FIG. 9 is a longitudinal sectional view showing a state in which the rotating cover shown in FIG. 7 is closed.

FIG. 6 is a perspective view of the inlet 1 in a state where the rotating cover 41 is opened. FIG. 7 is a longitudinal sectional view taken along an axis of the connection terminal 70 of the inlet 1 shown in FIG. 6. FIG. 8 is a longitudinal sectional view showing a state immediately before the rotating cover 41 shown in FIG. 7 is closed. FIG. 9 is a longitudinal sectional view showing a state in which the rotating cover 41 shown in FIG. 7 is closed.

As shown in FIGS. 6 and 7, in the rotating cover 41, in the cover open position where the cover front wall 43 is parallel to the top plate 53 of the outer case 51, the cover front wall 43 opens the tubular opening portion 26 of the housing 21. Thus, the inlet plug 5 can be inserted and fitted into the inlet 1.

When the inlet plug 5 is detached from the inlet 1, the actuator 60 is driven to rotate the rotating cover 41 to the cover closed position where the cover front wall 43 covers the tubular opening portion 26 of the housing 21. Then, the tubular portion 45 of the rotating cover 41 is inserted into the opening portion 26.

At this time, since the cover front wall 43 of the rotating cover 41 is rotated downward about the rotating shaft 49, in the state immediately before the rotating cover 41 is closed, the tubular portion 45 is not coaxial but inclined with respect to the opening portion 26 as shown in FIG. 8.

In the annular packing 11 attached to the outer peripheral face of the tubular portion 45, the first sealing portion 13 is disposed on the protruding end side above an outer face of the tubular portion 45, the second sealing portion 15 is disposed on the base end side below the outer face of the tubular portion 45, and the third sealing portions 14 and 14 are disposed on both sides of the outer face of the tubular portion 45 in an inclined manner. As shown in FIG. 8, the second sealing portion 15 and the third sealing portions 14 and 14 are compressed between an inner peripheral face of the opening portion 26 and the accommodating groove 47 of the tubular portion 45 at the same timing as the first sealing portion 13.

When the rotating cover 41 is further rotated, as shown in FIG. 9, the cover front wall 43 reaches the cover closed position covering the opening portion 26 of the housing 21. At the cover closed position, the tubular portion 45 is coaxial with the opening portion 26, and the annular packing 11 disposed at the fitting portion of the opening portion 26 and the tubular portion 45 is compressed in the direction intersecting the connector fitting direction, so that the fitting portion can be sealed.

Accordingly, according to the inlet 1 of the first embodiment, when the rotating cover 41 is closed, the annular packing 11 is brought into contact with an entire periphery of the facing sealing face 26*a* on an inner peripheral side of the facing opening portion 26 at the same timing, and thus it is possible to suppress contact failure such as deviation or biting of the annular packing 11.

Figure 10:
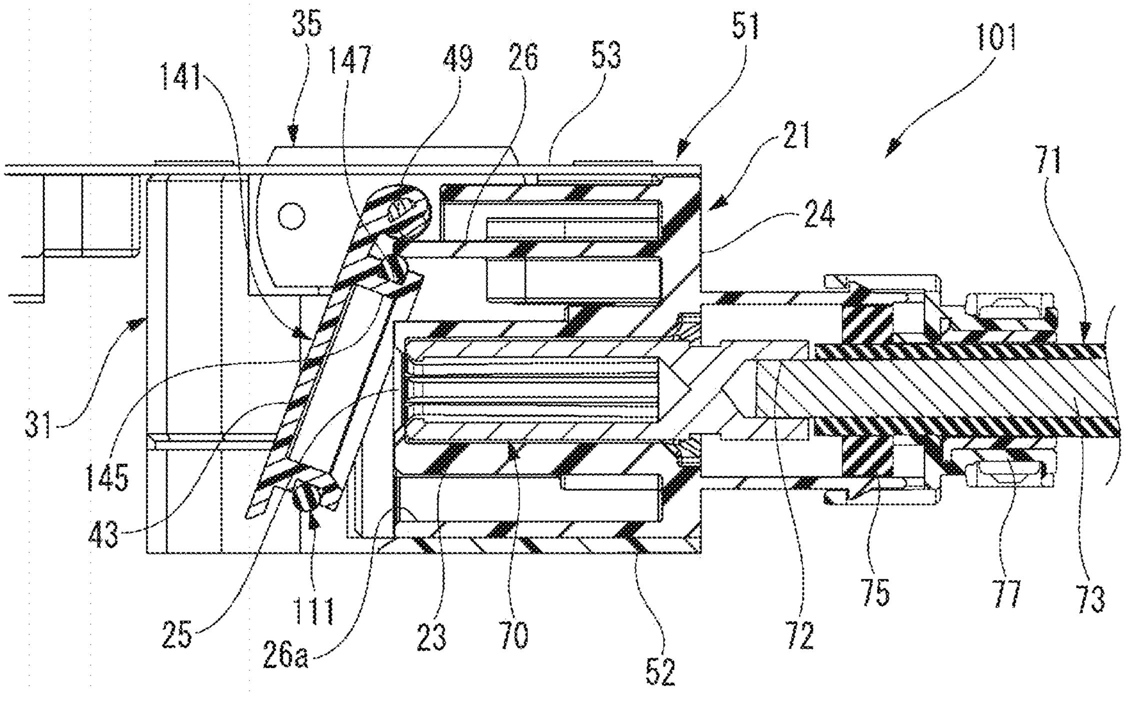
FIG. 10 is a longitudinal sectional view showing a state immediately before a rotating cover of an inlet constituting a connector according to a reference example is closed.

FIG. 10 is a longitudinal sectional view showing a state immediately before a rotating cover 141 of an inlet 101 constituting a connector according to a reference example is closed. The inlet 101 has a similar configuration to the inlet 1 of the first embodiment except that the rotating cover 41 is replaced with the rotating cover 141.

As shown FIG. 10, the rotating cover 141 of the inlet 101 according to the reference example includes the cover front wall 43, the rotating shaft 49, a tubular portion 145 protruding from an inner face of the cover front wall 43 and fitted into the opening portion 26 of the housing 21, and an annular packing 111 disposed at a fitting portion of the tubular portion 145.

An annular accommodating groove 147 to which the annular packing 111 is attached is provided along a peripheral direction in an outer peripheral face of the tubular portion 145. The annular packing 111 accommodated in the accommodating groove 147 is disposed parallel to the cover front wall 43 at an axially intermediate portion of the outer peripheral face of the tubular portion 145.

Accordingly, when the rotating cover 141 is closed, as shown in FIG. 10, the annular packing 111 disposed on the outer peripheral face of the tubular portion 145 may have a difference in timing of being in contact with the sealing face 26*a* on an inner peripheral side of the opening portion 26 that faces an upper portion of the tubular portion 145 and a lower face portion of the tubular portion 145. Therefore, in the annular packing 111 of the present reference example, compressive deformation is not uniform as the annular packing 11 of the first embodiment, and there is a concern that this may lead to contact failure such as deviation or biting, resulting in a decrease in waterproof property.

Further, as shown in FIG. 9, the first sealing portion 13 and the second sealing portion 15 of the inlet 1 according to the first embodiment are provided on the plane S1 that is inclined with respect to and intersects a connector fitting direction and is parallel to the rotating shaft 49 when the rotating cover 41 is closed.

Therefore, according to the inlet 1 of the first embodiment, when the rotating cover 41 is closed, the annular packing 11 is compressively deformed uniformly over the entire periphery by the sealing face 26*a* on the inner peripheral side of the facing opening portion 26, and good sealing performance can be ensured.

Further, as shown in FIG. 9, the second sealing portion 15 of the annular packing 11 in the inlet 1 according to the first embodiment is provided on the plane S2 including the rotating shaft 49 in a direction orthogonal to the connector fitting direction.

Thus, according to the inlet 1 of the first embodiment, when the rotating cover 41 is closed, the second sealing portion 15 of the annular packing 11 can perform good compressive deformation.

Figure 11:
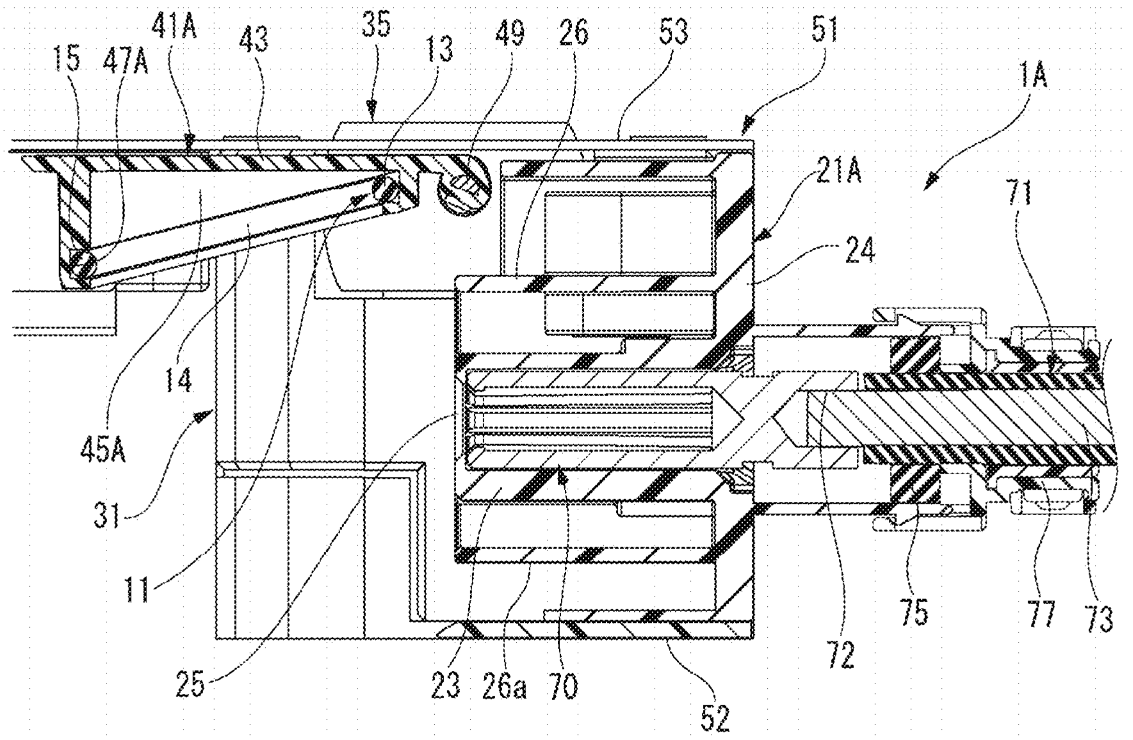
FIG. 11 is a longitudinal sectional view showing a state in which a rotating cover of an inlet constituting a connector according to a second embodiment of the present invention is opened.
Figure 12:
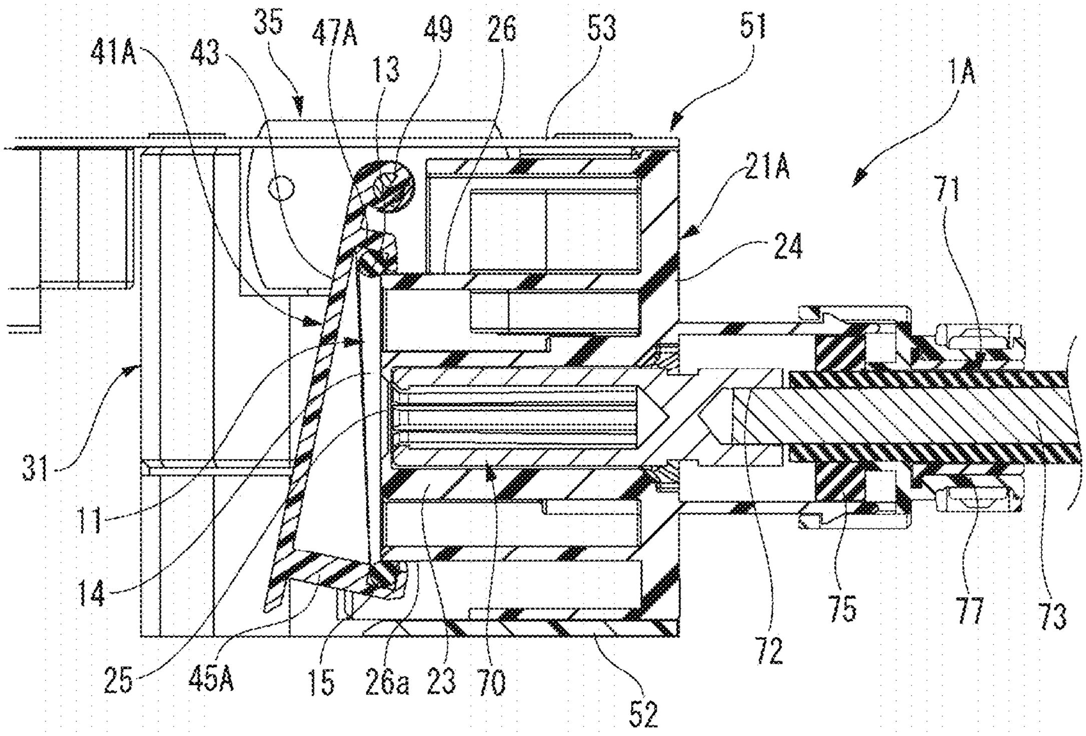
FIG. 12 is a longitudinal sectional view showing a state immediately before the rotating cover shown in FIG. 11 is closed.
Figure 13:
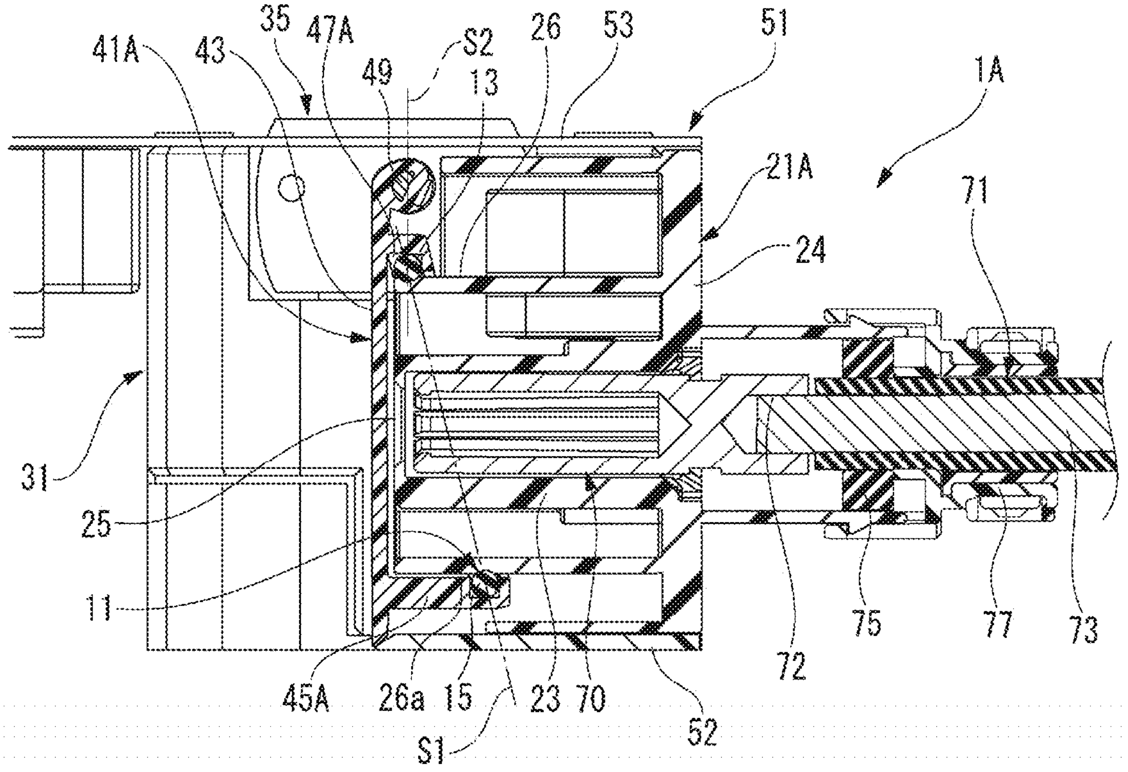
FIG. 13 is a longitudinal sectional view showing a state in which the rotating cover shown in FIG. 11 is closed.

FIG. 11 is a longitudinal sectional view showing a state in which a rotating cover 41A of an inlet 1A constituting a connector according to a second embodiment of the present invention is opened. FIG. 12 is a longitudinal sectional view showing a state immediately before the rotating cover 41A shown in FIG. 11 is closed. FIG. 13 is a longitudinal sectional view showing a state in which the rotating cover 41A shown in FIG. 11 is closed.

The inlet 1A according to the second embodiment has a similar configuration to the inlet 1 of the first embodiment except that the tubular opening portion 26 of the housing 21A is fitted into the tubular portion 45A of the rotating cover 41A. The same components as those of the inlet 1 of the first embodiment are denoted by the same reference signs, and detailed description thereof is omitted.

In the inlet 1A of the second embodiment, in the cover closed position where the cover front wall 43 of the rotating cover 41A covers the opening portion 26 of the housing 21A, the tubular portion 45A of the rotating cover 41A is fitted to an outside of the opening portion 26 of the housing 21A.

The rotating cover 41A includes the flat rectangular plate-shaped cover front wall 43, the rotating shaft 49 disposed on an upper side of the cover front wall 43, the tubular portion 45A protruding from an inner face of the cover front wall 43 and fitted to the outside of the opening portion 26 of the housing 21A, and the annular packing 11 disposed at a fitting portion of the tubular portion 45A.

The tubular portion 45A of the rotating cover 41 has an obliquely-cut cylindrical shape where a side closer to the rotating shaft 49 is shorter than a side farther from the rotating shaft 49, and is fitted to the outside the opening portion 26 of the housing 21A. An annular accommodating groove 47A to which the annular packing 11 is attached is provided in the inner peripheral face of the tubular portion 45A.

The flat long elliptical annular packing 11 includes the linear first sealing portion 13 and the linear second sealing portion 15 that are arranged parallel to the rotating shaft 49, and the semicircular third sealing portions 14 and 14 that respectively connect both end portions of the first sealing portion 13 and the second sealing portion 15.

A portion of the accommodating groove 47A in which the first sealing portion 13 is accommodated is formed parallel to the rotating shaft 49 on a base end side in an upper side of an inner face of the tubular portion 45A. Further, a portion of the accommodating groove 47A in which the second sealing portion 15 is accommodated is formed parallel to the rotating shaft 49 on a protruding end side in a lower side of the inner face of the tubular portion 45A. Portions of the accommodating groove 47A in which the third sealing portions 14 and 14 are respectively accommodated are formed on both sides of the inner face to be inclined with respect to an axial direction (connector fitting direction) of the tubular portion 45A.

Accordingly, as shown in FIG. 11, the first sealing portion 13 is provided at a position closer to the rotating shaft 49 of the rotating cover 41A than the second sealing portion 15. The second sealing portion 15 is disposed at a position farther away from the rotating shaft 49 than the first sealing portion 13, and is disposed to be compressed between the opening portion 26 and the tubular portion 45A at the same timing as the first sealing portion 13 when the rotating cover 41A is closed (see FIG. 13).

That is, the annular packing 11 accommodated in the accommodating groove 47A is provided such that, when the rotating cover 41A is closed, the first sealing portion 13, the second sealing portion 15, and the third sealing portions 14 and 14 are located on the plane S1 (see FIG. 13) that is inclined with respect to and intersects the connector fitting direction of the tubular portion 45A and is parallel to the rotating shaft 49. Further, the annular packing 11 is provided such that, when the rotating cover 41A is closed, the first sealing portion 13 is located on the plane S2 (see FIG. 13) including the rotating shaft 49 in a direction orthogonal to the connector fitting direction.

Next, an operation of the above-described rotating cover 41A will be described.

As shown in FIG. 11, in the rotating cover 41A, in the cover open position where the cover front wall 43 is parallel to the top plate 53 of the outer case 51, the cover front wall 43 opens the tubular opening portion 26 of the housing 21A. Thus, the inlet plug 5 can be inserted and fitted into the inlet 1A.

When the inlet plug 5 is detached from the inlet 1, the actuator 60 is driven to rotate the rotating cover 41A to the cover closed position where the cover front wall 43 covers the tubular opening portion 26 of the housing 21A. Then, the tubular portion 45 of the rotating cover 41A is fitted to the outside of the opening portion 26.

At this time, since the cover front wall 43 of the rotating cover 41 is rotated downward about the rotating shaft 49, in the state immediately before the rotating cover 41 is closed, the tubular portion 45 is not coaxial but inclined with respect to the opening portion 26 as shown in FIG. 12.

In the annular packing 11 attached to the inner peripheral face of the tubular portion 45A, the first sealing portion 13 is disposed on the base end side above an inner face of the tubular portion 45, the second sealing portion 15 is disposed on the protruding end side below the inner face of the tubular portion 45A, and the third sealing portions 14 and 14 are disposed on both sides of the inner face of the tubular portion 45A in the inclined manner. As shown in FIG. 12, the second sealing portion 15 and the third sealing portions 14 and 14 are compressed between the outer peripheral face of the opening portion 26 and the accommodating groove 47A of the tubular portion 45A at the same timing as the first sealing portion 13.

When the rotating cover 41A is further rotated, as shown in FIG. 13, the cover front wall 43 reaches the cover closed position covering the opening portion 26 of the housing 21A. At the cover closed position, the tubular portion 45A is coaxial with the opening portion 26, and the annular packing 11 disposed at the fitting portion of the opening portion 26 and the tubular portion 45A is compressed in the direction intersecting the connector fitting direction, so that the fitting portion can be sealed.

Accordingly, according to the inlet 1A of the second embodiment, when the rotating cover 41A is closed, the annular packing 11 is brought into contact with an entire periphery of the facing sealing face 26*a* on an outer peripheral side of the facing opening portion 26 at the same timing, and thus it is possible to suppress contact failure such as deviation or biting of the annular packing 11.

Further, as shown in FIG. 13, the first sealing portion 13 and the second sealing portion 15 of the inlet 1A according to the second embodiment are provided on the plane S1 that is inclined with respect to and intersects the connector fitting direction and is parallel to the rotating shaft 49 when the rotating cover 41 is closed.

Therefore, according to the inlet 1A of the second embodiment, when the rotating cover 41A is closed, the annular packing 11 is compressively deformed uniformly over the entire periphery by the sealing face 26*a* on the outer peripheral side of the facing opening portion 26, and good sealing performance can be ensured.

Further, as shown in FIG. 13, the first sealing portion 13 of the annular packing 11 in the inlet 1A according to the second embodiment is provided on the plane S2 including the rotating shaft 49 in a direction orthogonal to the connector fitting direction.

According to the inlet 1 of the second embodiment, when the rotating cover 41A is closed, the first sealing portion 13 of the annular packing 11 can perform good compressive deformation.

According to the inlets 1 and 1A of the above-described embodiments, it is possible to ensure stable waterproof performance in the connector with a rotating cover.

The present invention is not limited to the embodiments described above and can be appropriately modified, improved, and the like. In addition, materials, shapes, sizes, numbers, arrangement positions, or the like of components in the embodiments described above are freely selected and are not limited as long as the present invention can be implemented.

For example, although an inlet used in an electric vehicle or the like is used as a connector with a rotating cover in each of the above embodiments, the connector according to the present invention is not limited thereto, and can be applied to various connectors based on the spirit of the present invention.

Further, in each of the above embodiments, the annular packing 11 is provided on the rotating cover 41, 41A sides, but the annular packing 11 can also be provided on a tubular opening portion 26 side of the housing 21.

Further, the tubular opening portion of the housing and the tubular portion of the rotating cover are not limited to those having the flat elliptical cross section, and it goes without saying that various shapes such as an elliptical cross section and a circular cross section can be adopted.

Here, features of the embodiment of the connector according to the present invention described above are briefly summarized and listed in the following [1] to [3].

[1] A connector (inlet 1, 1A) includes:

a housing (21, 21A) having a tubular opening portion (26);

a rotating cover (41, 41A) having a tubular portion (45, 45A) fitted into the opening portion (26) and rotatably attached to the housing (21, 21A); and an annular packing (11) disposed at a fitting portion of the opening portion (26) and the tubular portion (45, 45A) and configured to seal the fitting portion by being compressed in a direction intersecting a connector fitting direction, in which the annular packing (11) includes a first sealing portion (13) and a second sealing portion (15), the first sealing portion (13) is provided at a position closer to a rotating shaft (49) of the rotating cover (41, 41A) than the second sealing portion (15), and the second sealing portion (15) is provided at a position farther away from the rotating shaft (49) than the first sealing portion (13), and is compressed between the opening portion (26) and the tubular portion (45, 45A) at the same timing as the first sealing portion (13) when the rotating cover (41, 41A) is closed.

According to the connector (inlet 1, 1A) described in the above [1], when the rotating cover (41, 41A) is closed, the annular packing (11) is brought into contact with an entire outer periphery of a facing sealing face (26*a*) at the same timing, and thus it is possible to suppress contact failure such as deviation or biting of the annular packing (11).

[2] The connector (inlet 1, 1A) according to [1], in which when the rotating cover (41, 41A) is closed, the first sealing portion (13) and the second sealing portion (15) are provided on a plane (S1) that is inclined with respect to and intersects the connector fitting direction and is parallel to the rotating shaft (49).

According to the connector (inlet 1, 1A) described in the above [2], when the rotating cover (41, 41A) is closed, the annular packing (11) is compressively deformed uniformly over the entire periphery by the facing sealing face (26*a*), and thus it is possible to ensure good sealing performance of the annular packing (11).

[3] The connector (inlet 1) according to the above [1] or [2], in which the annular packing (11) is attached to an annular accommodating groove (47) provided on an outer peripheral face, which is fitted to an inner side, of one of the opening portion (26) and the tubular portion (45).

According to the connector (inlet 1) described in the above [3], it is easy to attach the annular packing (11).

The present application is based on a Japanese patent application (Japanese Patent Application No. 2022-025079) filed on Feb. 21, 2022, and the contents thereof are incorporated herein by reference.

INDUSTRIAL APPLICABILITY

According to the connector of the present invention, it is possible to ensure stable waterproof performance in the connector with a rotating cover. The present invention having this effect is useful for a rotating cover for opening and closing a front opening of a housing in a charging inlet device.

REFERENCE SIGNS LIST

1 inlet (connector)
11 annular packing
13 first sealing portion
15 second sealing portion
21 housing
26 opening portion
41 rotating cover
45 tubular portion
49 rotating shaft

The invention claimed is:

1. A connector comprising:

a housing having an opening portion having a tubular shape;

a rotating cover having a tubular portion fitted into the opening portion and rotatably attached to the housing; and an annular packing disposed at a fitting portion of the opening portion and the tubular portion and configured to seal the fitting portion by being compressed in a direction intersecting a connector fitting direction, wherein:

the annular packing includes a first sealing portion and a second sealing portion;

the first sealing portion is provided at a position closer to a rotating shaft of the rotating cover than the second sealing portion;

the second sealing portion is provided at a position farther away from the rotating shaft than the first sealing portion, and is compressed between the opening portion and the tubular portion at the same timing as the first sealing portion when the rotating cover is closed; and the tubular portion is fitted outside the opening portion, and the annular packing is provided so that the first sealing portion and the second sealing portion are positioned on a first plane inclined and intersecting with respect to the connector fitting direction and parallel to the rotating shaft so that the second sealing portion is positioned on a rear side of the connector fitting direction with respect to the first sealing portion when the rotating cover is closed, and the first sealing portion is positioned on a second plane perpendicular to the connector fitting direction and including the rotating shaft when the rotating cover is closed.

* * * * *